US010438106B2

(12) United States Patent
Breed et al.

(10) Patent No.: US 10,438,106 B2
(45) Date of Patent: Oct. 8, 2019

(54) SMARTCARD

(71) Applicant: Intelligent Technologies International, Inc., Miami Beach, FL (US)

(72) Inventors: David S Breed, Miami Beach, FL (US); Wendell C Johnson, San Pedro, CA (US); Wilbur E DuVall, Katy, TX (US); Oleksandr Shostak, Kyiv (UA); Vyacheslav Sokurenko, Kyiv (UA)

(73) Assignee: Intellignet Technologies International, Inc., Miami Beach, FL (US)

( * ) Notice: Subject to any disclaimer, the term of this patent is extended or adjusted under 35 U.S.C. 154(b) by 84 days.

(21) Appl. No.: 15/521,318

(22) PCT Filed: Oct. 21, 2015

(86) PCT No.: PCT/US2015/056710
§ 371 (c)(1),
(2) Date: Apr. 24, 2017

(87) PCT Pub. No.: WO2016/073202
PCT Pub. Date: May 12, 2016

(65) Prior Publication Data
US 2017/0300799 A1 Oct. 19, 2017

Related U.S. Application Data

(60) Provisional application No. 62/075,030, filed on Nov. 4, 2014.

(51) Int. Cl.
*G06K 19/073* (2006.01)
*G06Q 20/34* (2012.01)
(Continued)

(52) U.S. Cl.
CPC ....... *G06K 19/07354* (2013.01); *B42D 25/00* (2014.10); *G06K 19/0718* (2013.01);
(Continued)

(58) Field of Classification Search
CPC ......... G06K 19/07354; G06K 19/0718; G06K 19/07372; G06K 19/0723; B42D 25/00;
(Continued)

(56) References Cited

U.S. PATENT DOCUMENTS 4,591,189 A * 5/1986 Holmen ................. B42D 25/21
283/83
4,593,384 A 6/1986 Kleijne
(Continued)

FOREIGN PATENT DOCUMENTS

EP 0128672 A1 12/1984
EP 1175498 B1 7/2005
(Continued)

OTHER PUBLICATIONS

Search Report and Written Opinion for PCT/US2015/056710 dated Jan. 15, 2016.
(Continued)

*Primary Examiner* — Carl G Colin
*Assistant Examiner* — Han Yang
(74) *Attorney, Agent, or Firm* — Brian Roffe

(57) ABSTRACT

Card including a substrate, at least one biometric data entry device on the substrate to receive biometric data about an individual holding the substrate, a memory component on the substrate and containing biometric data about an individual possessing the card and at least one private key, and a processor configured to compare biometric data received via the biometric data entry device to biometric data contained in the memory component to determine whether they match. When there is a biometric data match, a process requiring use of the private key(s) is initiated for authorized use of the card. A chassis intrusion detector system detects tampering with the card and upon such detection, causes deletion of the private key(s) to thereby prevent unauthorized use of the card.

20 Claims, 11 Drawing Sheets

(51) Int. Cl.
*G06Q 20/40* (2012.01)
*G06K 19/07* (2006.01)
*G07F 7/08* (2006.01)
*G07F 7/10* (2006.01)
*B42D 25/00* (2014.01)

(52) U.S. Cl.
CPC ... *G06K 19/0723* (2013.01); *G06K 19/07372* (2013.01); *G06Q 20/352* (2013.01); *G06Q 20/40145* (2013.01); *G07F 7/0813* (2013.01); *G07F 7/1016* (2013.01)

(58) Field of Classification Search
CPC ... G07F 7/1016; G07F 7/0813; G06Q 20/352; G06Q 20/40145
See application file for complete search history.

(56) References Cited

U.S. PATENT DOCUMENTS

| | | | |
|---|---|---|---|
| 5,291,243 A | 3/1994 | Heckman et al. | |
| 5,629,984 A | 5/1997 | McManis | |
| 6,023,372 A | 2/2000 | Spitzer et al. | |
| 6,121,544 A | 9/2000 | Petsinger | |
| 6,320,610 B1 | 11/2001 | Van Sant et al. | |
| 6,529,209 B1 | 3/2003 | Dunn et al. | |
| 6,532,298 B1 | 3/2003 | Cambier et al. | |
| 6,665,428 B1 | 12/2003 | Gozzini | |
| 6,853,293 B2 | 2/2005 | Swartz et al. | |
| 7,054,162 B2 | 5/2006 | Benson et al. | |
| 7,278,025 B2 | 10/2007 | Saito et al. | |
| 7,278,734 B2 | 10/2007 | Jannard et al. | |
| 7,482,925 B2 | 1/2009 | Hammad et al. | |
| 7,551,098 B1* | 6/2009 | Chock | G08B 29/08 174/50 |
| 7,758,911 B2 | 7/2010 | Heffner | |
| 7,791,809 B2 | 9/2010 | Filipovich et al. | |
| 7,792,552 B2 | 9/2010 | Thomas et al. | |
| 7,936,274 B2 | 5/2011 | Shkolnikov et al. | |
| 8,020,220 B2 | 9/2011 | McElroy et al. | |
| 8,020,989 B2 | 9/2011 | Jannard et al. | |
| 8,165,347 B2 | 4/2012 | Heinzmann et al. | |
| 8,203,502 B1 | 6/2012 | Chi et al. | |
| 8,223,024 B1 | 7/2012 | Petron | |
| 8,467,133 B2 | 6/2013 | Miller | |
| 8,472,120 B2 | 6/2013 | Border et al. | |
| 8,477,425 B2 | 7/2013 | Border et al. | |
| 8,482,859 B2 | 7/2013 | Border et al. | |
| 8,488,246 B2 | 7/2013 | Border et al. | |
| 8,678,294 B2 | 3/2014 | Maus | |
| 8,696,113 B2 | 4/2014 | Lewis | |
| 8,733,927 B1 | 5/2014 | Lewis | |
| 8,733,928 B1 | 5/2014 | Lewis | |
| 8,750,558 B2 | 6/2014 | Lee et al. | |
| 8,814,691 B2 | 8/2014 | Haddick et al. | |
| 9,349,232 B2 | 5/2016 | Cannon et al. | |
| 9,467,288 B2 | 10/2016 | Obukhov et al. | |
| 2002/0130673 A1 | 9/2002 | Pelrine et al. | |
| 2002/0130821 A1 | 9/2002 | Bronson | |
| 2002/0186838 A1* | 12/2002 | Brandys | G06Q 20/341 380/30 |
| 2002/0196554 A1 | 12/2002 | Cobb et al. | |
| 2003/0009683 A1 | 1/2003 | Schwenck et al. | |
| 2003/0009684 A1 | 1/2003 | Schwenck et al. | |
| 2004/0101178 A1 | 5/2004 | Fedorovskaya et al. | |
| 2004/0177658 A1 | 9/2004 | Mitchell | |
| 2004/0229199 A1 | 11/2004 | Ashley et al. | |
| 2005/0201585 A1 | 9/2005 | Jannard et al. | |
| 2006/0152360 A1* | 7/2006 | Vatsaas | G08B 13/126 340/550 |
| 2007/0052672 A1 | 3/2007 | Ritter et al. | |
| 2007/0067119 A1 | 3/2007 | Loewen et al. | |
| 2008/0089545 A1 | 4/2008 | Jannard et al. | |
| 2008/0285801 A1 | 11/2008 | Heinzmann et al. | |
| 2009/0008459 A1* | 1/2009 | Mainguet | G06K 19/0716 235/492 |
| 2009/0065591 A1* | 3/2009 | Paul | G06F 21/77 235/492 |
| 2009/0097688 A1* | 4/2009 | Lewis | H04R 5/023 381/376 |
| 2009/0231722 A1 | 9/2009 | Filipovich et al. | |
| 2010/0097215 A1 | 4/2010 | Locher | |
| 2010/0171202 A1 | 7/2010 | Tian et al. | |
| 2010/0180350 A1 | 7/2010 | Glaubert | |
| 2010/0182020 A1* | 7/2010 | Thornley | G08B 13/128 324/691 |
| 2010/0287375 A1* | 11/2010 | Lee | G06Q 20/04 713/171 |
| 2010/0315720 A1 | 12/2010 | Filipovich et al. | |
| 2010/0327856 A1 | 12/2010 | Lowy | |
| 2011/0031982 A1 | 2/2011 | Leon et al. | |
| 2011/0102141 A1* | 5/2011 | Wu | G06K 19/06187 340/5.82 |
| 2011/0103585 A1 | 5/2011 | Tuck et al. | |
| 2011/0169932 A1 | 7/2011 | Mula et al. | |
| 2011/0187523 A1 | 8/2011 | Edelstein et al. | |
| 2011/0197327 A1 | 8/2011 | McElroy et al. | |
| 2011/0227603 A1 | 9/2011 | Leon et al. | |
| 2011/0279228 A1 | 11/2011 | Kumar | |
| 2012/0062241 A1 | 3/2012 | Rossi et al. | |
| 2012/0062444 A1 | 3/2012 | Cok et al. | |
| 2012/0063046 A1 | 3/2012 | Rossi et al. | |
| 2012/0068914 A1 | 3/2012 | Jacobsen et al. | |
| 2012/0176220 A1 | 7/2012 | Garcia | |
| 2012/0212414 A1 | 8/2012 | Osterhout et al. | |
| 2013/0081127 A1* | 3/2013 | Chen | G06Q 20/341 726/9 |
| 2013/0127980 A1 | 5/2013 | Haddick et al. | |
| 2013/0169683 A1 | 7/2013 | Perez et al. | |
| 2013/0278631 A1 | 10/2013 | Border et al. | |
| 2013/0286053 A1 | 10/2013 | Fleck et al. | |
| 2013/0298252 A1 | 11/2013 | Ribeiro-Pereira | |
| 2014/0085452 A1 | 3/2014 | Nistico et al. | |
| 2014/0138447 A1* | 5/2014 | Goldman | G06K 19/06206 235/492 |
| 2014/0267420 A1 | 9/2014 | Schowengerdt et al. | |
| 2015/0037781 A1 | 2/2015 | Breed et al. | |
| 2016/0035233 A1 | 2/2016 | Breed | |

FOREIGN PATENT DOCUMENTS

| | | |
|---|---|---|
| WO | 2015148607 A1 | 10/2015 |
| WO | 2016028864 A1 | 2/2016 |
| WO | 2016073202 A1 | 5/2016 |

OTHER PUBLICATIONS

International Search Report for PCT/US2015/045846 dated Dec. 7, 2015.
Written Opinion for PCT/US2015/045846 dated Dec. 7, 2015.
International Search Report for PCT/US15/22390 dated Jul. 29, 2015 with Written Opinion.

* cited by examiner

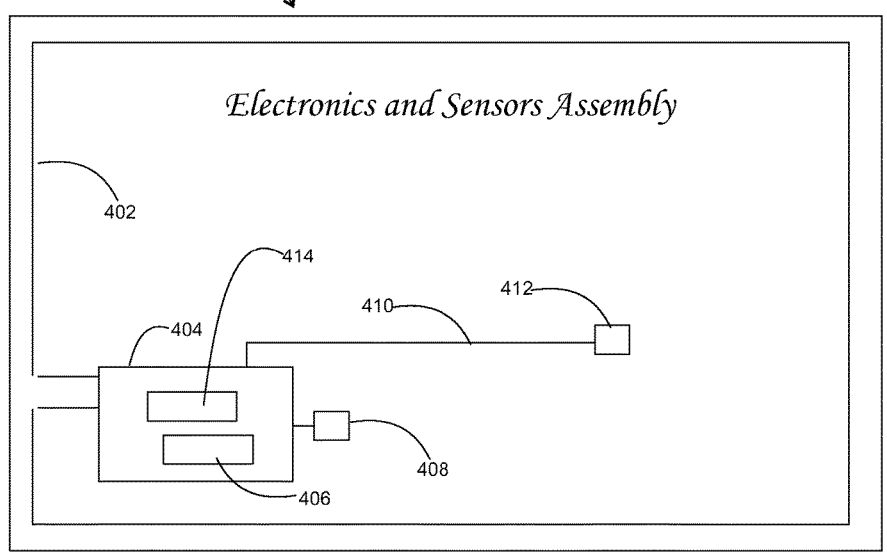
FIG. 5
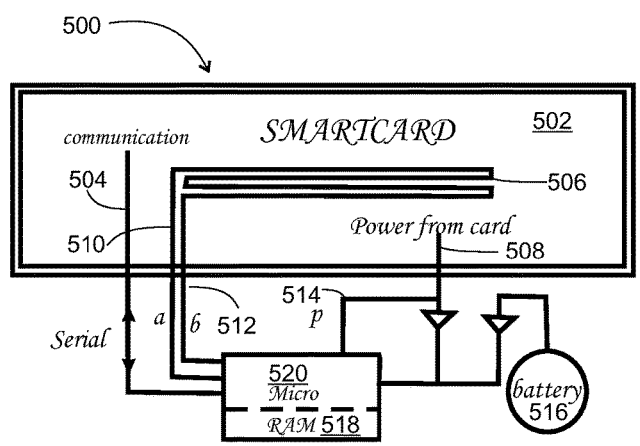
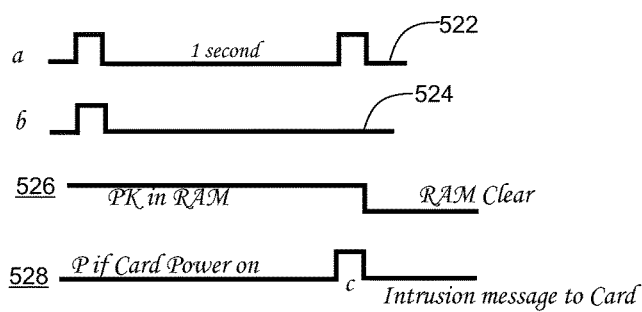
FIG. 5A

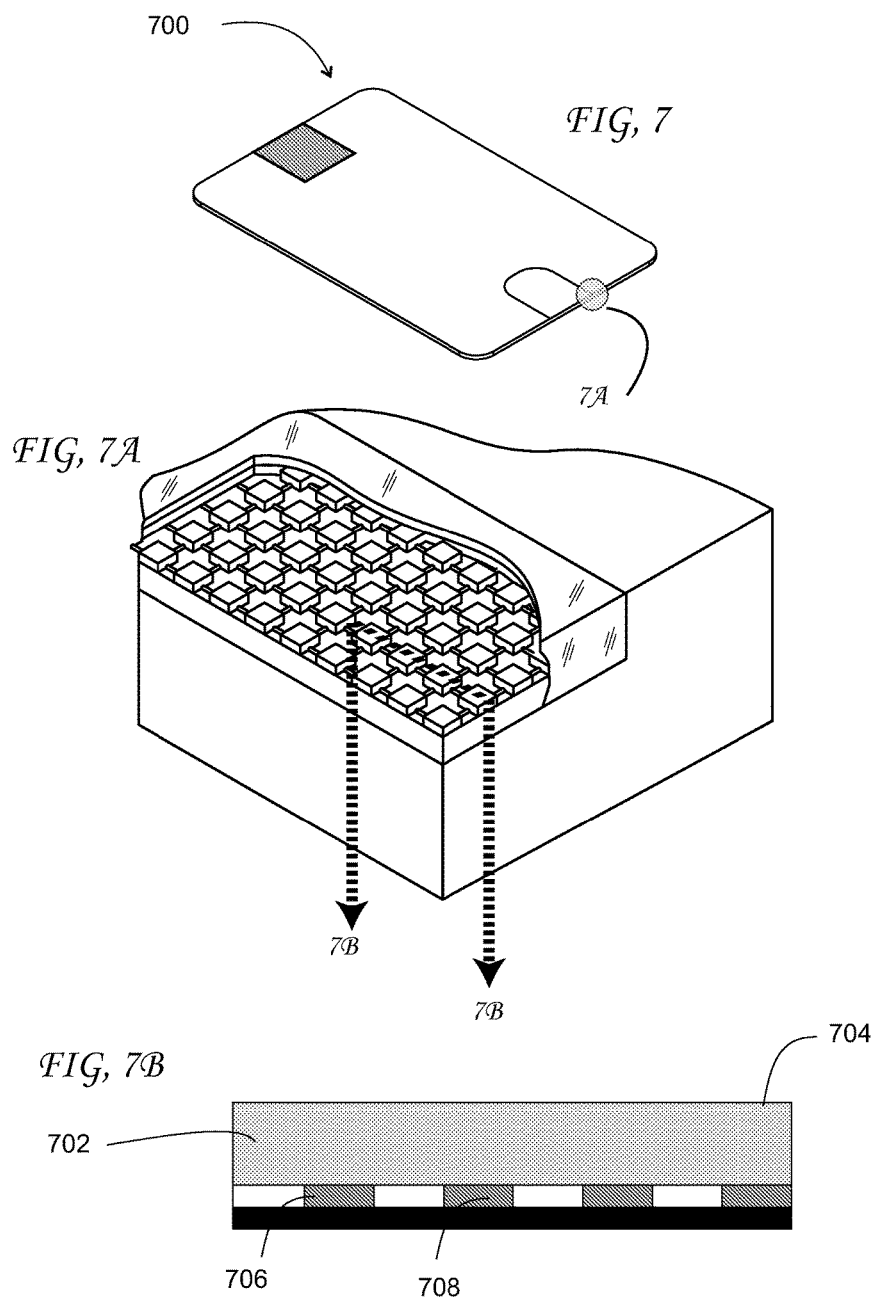

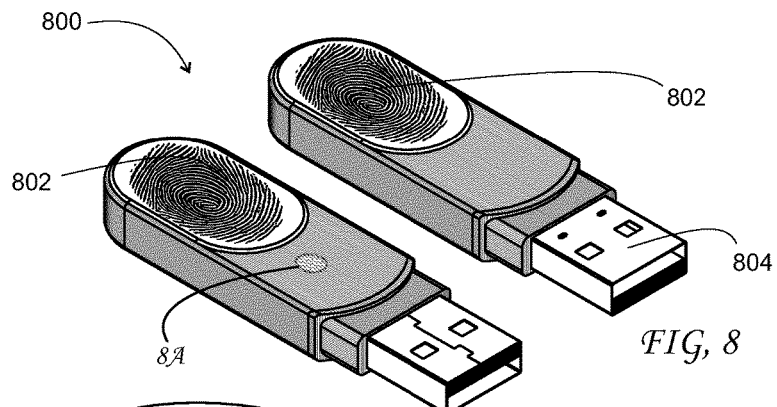
FIG. 8
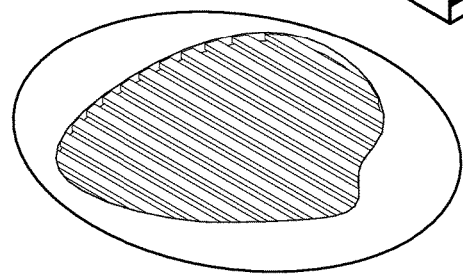
FIG. 8A
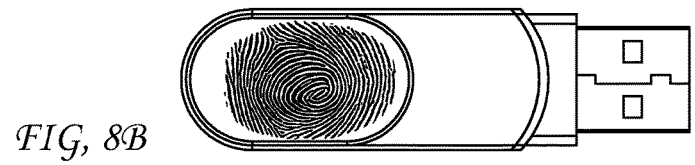
FIG. 8B
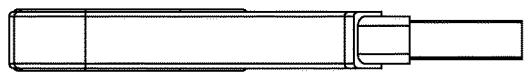
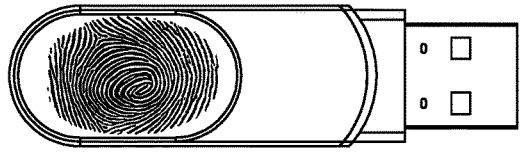

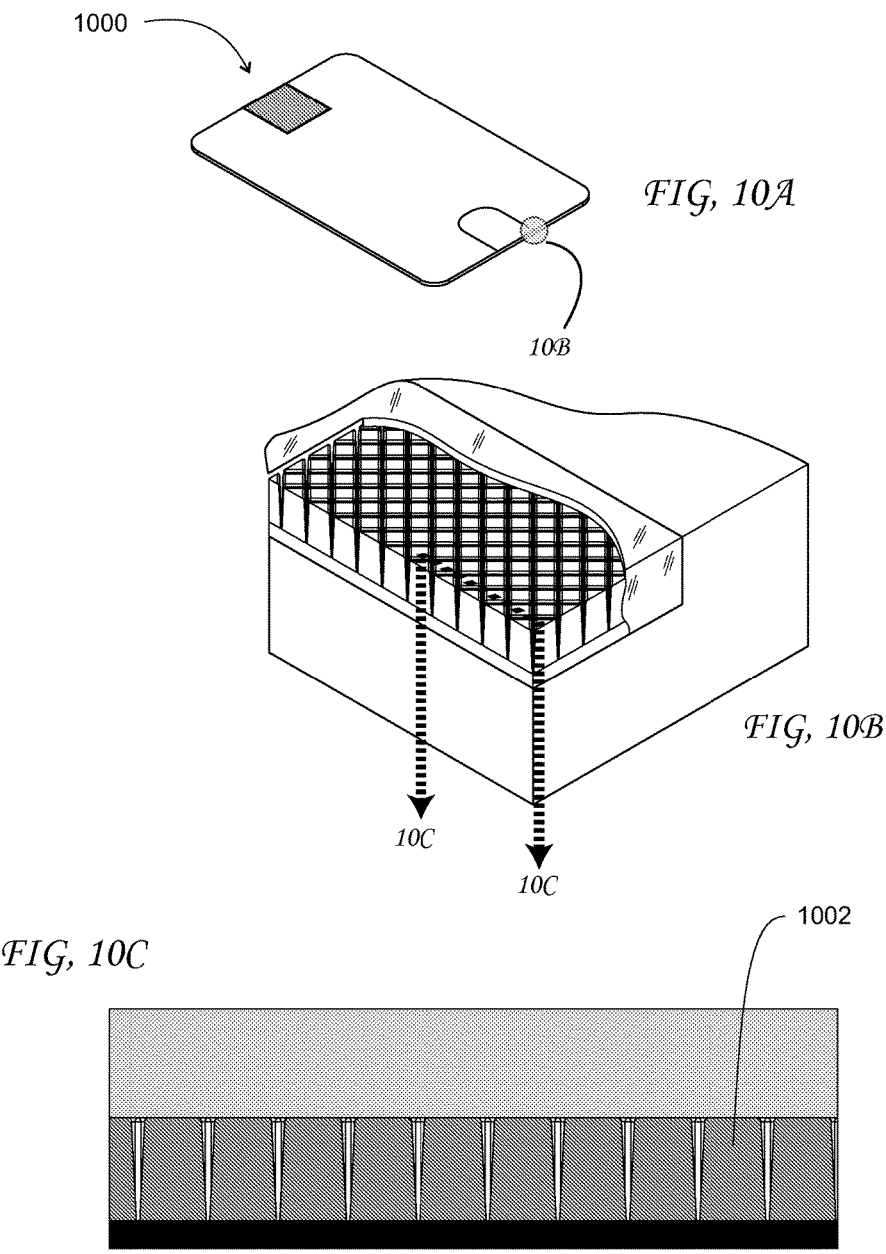

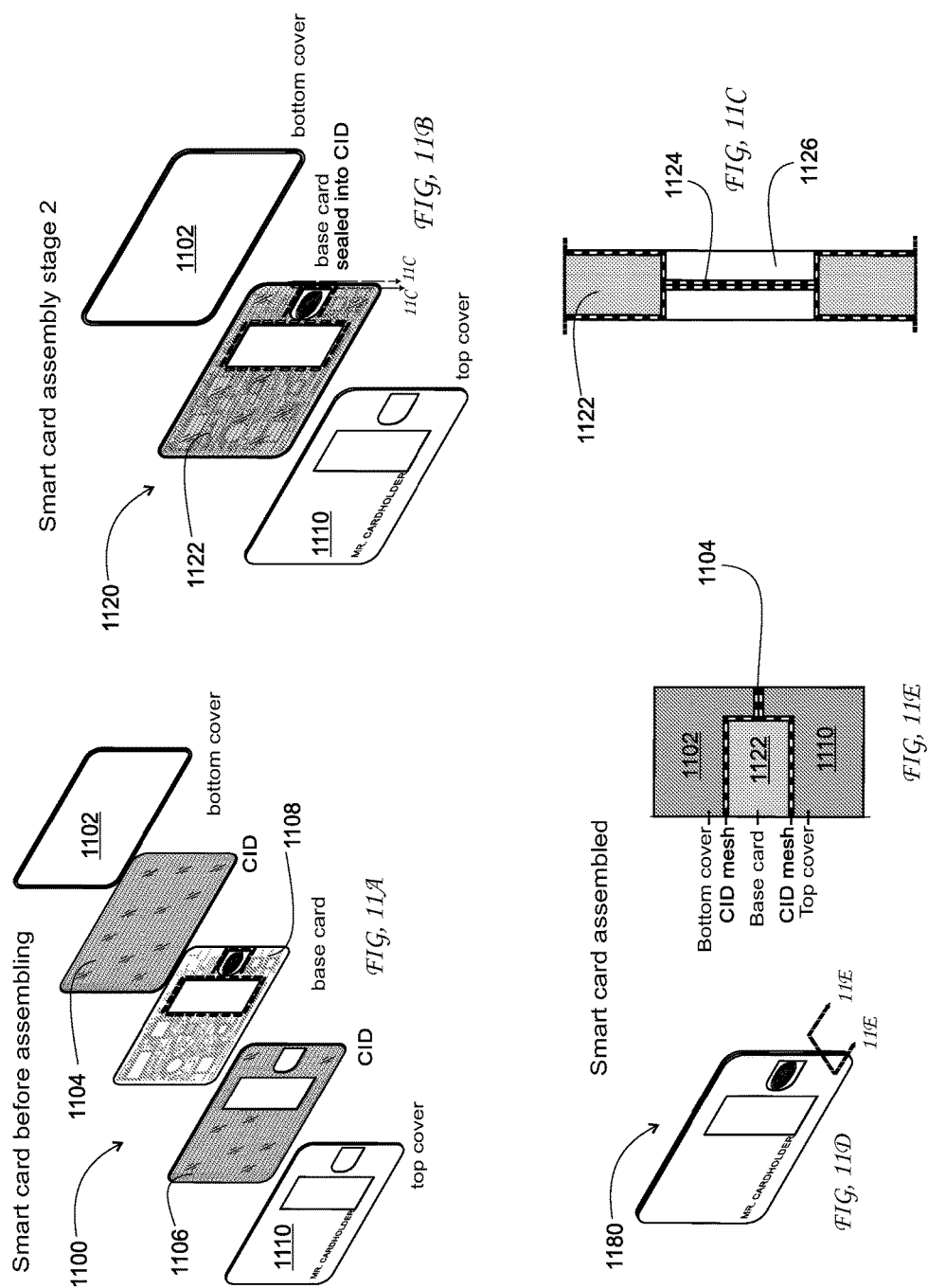

us 10,438,106 B2

SMARTCARD

TECHNICAL FIELD

The present disclosure relates generally to the field of smart cards which prevent fraudulent use of the cards in the event of either the theft of the card number or of the card itself.

BACKGROUND ART

In the 4th quarter of 2013, the amount spent in retail consumer sales was estimated at $1.147 trillion. More than 90 percent of those retail sales were made at the physical Point of Sale (POS) and an additional $69 billion was spent in e-commerce (at 6 percent of total retail sales). According to the latest figures released by EMVco, the company says 2.37 billion EMV chip cards, as of 2013 are in use globally. The Aite Group has reported according to its research that by the end of 2015, 70% of all payments cards in the United States will be EMV chip cards.

Global unit shipments of smart cards are expected to rise by 2.1 billion from 2014 through 2019, about equal to the combined populations of China, the United States, Indonesia and Brazil, according to IHS Technology. Smart card shipments in 2019 will rise to 10.9 billion units, up from 8.8 billion in 2014. To put this in perspective, the number of smart cards shipped in 2019 alone will allow each of the world's 7.6 billion projected inhabitants to obtain 1.4 smart cards during the year.

Asia plays a key role in driving growth of the overall smart card market. Undoubtedly countries like China, India and Indonesia will be crucial to the overall health of the smart card market over the next five years. Moreover, electronic passports are contributing particularly high volumes for the Asian market. In fact, the Asia-Pacific region accounted for the highest number of ePassport shipments in 2013.

A general description of the state of the art of smartcards can be found in U.S. Pat. No. 8,016,191 which is incorporated herein by reference. While this and other smartcard systems have made significant improvements in solving some of the authentication issues which have permitted significant fraud in the credit card industry in the past, there remains significant weakness in current existing and proposed systems.

There has been a great deal of discussion in the press over the past several years about fraud related to debit and credit cards. Generally, this fraud has been perpetrated through the theft of credit card numbers from companies such as Target and Home Depot. A number of solutions have been proposed to this problem as reflected in the following.

SecureCard (www.securecardtechnologies.com/) SecureCard is a secure payment card that operates in nearly identical fashion to traditional credit and debit cards. The difference is that the SecureCard comes with an embedded computer chip and a new battery technology that uses identification authenticators to assign a token to a user. The token then generates a distinct and random personal identification code in the form of a one-time password that is time- and event-based. This card can be defeated in a number of ways including, if it is stolen, the thief can use it to pay for merchandise.

SmartMetric (www.smartmetric.com/) SmartMetric provides fingerprint-activated payment credit and debit cards. The fingerprint verification is done on the card using the SmartMetric developed miniature battery-powered fingerprint reader that is built inside the credit or debit card. On the surface is a capacitive fingerprint sensor. When a match with the card user's fingerprint takes place, the card's internal processor activates the card's surface-mounted EMV chip that then allows the card to be used at any standard EMV compliant ATM or Point Of Sale merchant card reader. This card can be defeated if the hacker has captured the fingerprint of the owner and made a thin film which expresses the fingerprint. This card requires a separate communication to the Internet to transmit the credit card information to the card issuer. Also, it requires a cell phone call to the SmartMetric site to change the credit card which is used. Finally, the fingerprint swipe reader is far less accurate than other methods which capture the entire fingerprint either optically, ultrasonically or capacitively. Reference is also made to WO/2005/020127A3 to Smartmetric.

Coin (onlycoin.com/). Coin does not provide any special fraud protection. It does allow the owner to replace several credit cards with one.

Plastc www.plastc.com/card. Plastc has a product which seems identical to Coin. It provides both a magnetic stripe with Pin and a EVN chip. It has an E-ink display touchscreen and can connect to other devices with Bluetooth. Its flash memory can hold up to 20 credit or ID cards. Its rechargeable Battery can hold a 30-day charge and wireless charging is provided. As with Coin, its magnetic stripe is rewritable.

All of the above smartcards can likely be defeated if the theft obtains possession of the smartcard and, in some cases, a copy of the owner's fingerprint. Once the physical card has been acquired it can be hacked and any information including private keys stored therein can be obtained. What is needed, therefore, is a smartcard which cannot be hacked.

A significant feature of this invention is to use a mesh of fine wires which are incorporated within a plastic film to provide a protection mechanism for critical data stored within the device such as one or more private keys and stored biometric information. Although various tripwire systems and devices have been in use for many years, the use of very fine wires embedded in a plastic film to comprise a continuous circuit where the resistance, capacitance or inductance is monitored for any significant changes is believed to be novel for use in covering electronic circuits. The closest art seems to be US 20080211669 which describes a method of sensing for intrusion into large storage areas.

Additional prior art to be considered includes WO2015/148607 to the same assignee and prior art cited in its search report, namely, US 20020130673, US 20040101178, US 20040177658, US 20100097215, US 20100180350, US 20100327856, US 20110187523, US 20120212414, U.S. Pat. No. 5,291,243, and EP 0128672, US 20120170819 to ASD, EP 1208528B1, EP 1766547A1, EP 1055188A1, EP 1330185A1, US 20130108125, US 20080069413, U.S. Pat. Nos. 6,778,686, 7,330,571, and WO/1999/041696A1 to Fingerprint Cards AB, EP1759337A1, WO/2005/104704A1, US20050240778 to e-Smart Technologies Inc., EP 2290589A1, EP 2463808A1, US 20140015639, and US 20130166902 to Gemalto, US 20080298646, WO 2006/080886A1, US20140221044, and US 20120047566 to Precision Biometrics AB, JP2010108506A, JP2012128860A, U.S. Pat. Nos. 8,016,203, 6,484,937, EP 1374160B1, U.S. Pat. Nos. 8,505,827, 8,517,278, and 8,430,323 to Oberthur Technologies, US 20100275259, U.S. Pat. Nos. 7,715,593, 8,144,941, WO/2004/114190A1, and US 20100117794 to URU Technology Inc., EP 2304644B1, WO/2009/140968A1, EP 2304644A1, U.S. Pat. No. 7,681,232, EP 2290625A1, US 20100265037, EP2278564A1, WO/2005/

086102A1, US20070189581, and US20050194452 to Card-Lab, WO/2001/091048A1, WO/2004/047018A2, U.S. Pat. No. 6,644,551, US 20030116633, and WO/2004/068395A2 to CardTech, DE19818670A1 and DE10339065A1 to Zeit-Control, U.S. Pat. No. 8,496,174, US20080000989, US20080051143, EP2051188A1, EP1892645B1, EP1892645A2, EP2110751A1, EP2093702A1, EP1873689A1, and EP1892645A3 to WatchData, U.S. Pat. Nos. 7,429,036, 8,403,229, 8,419,889, 8,720,786, US20090315321, US20110084144, US20110258070, US20120047716, US20120256003, US20130132229, US20130306512, US20140021261, US20140122289 and WO/2014/015329A1, to CPI Card Group; U.S. Pat. Nos. 5,637,858, 6,964,377, 8,226,014, 8,282,010, 8,403,230, 8,423,797, 8,814,036, US20100217799 and US20140138444 to Giesecke & Devrient, U.S. Pat. Nos. 7,505,945, 8,358,778, 8,549,308 and WO/2008/102169A2, to Cryptomathic, JP2011025083A, EP1567057A1, EP1303829A2, EP1058513B1, EP1303828A2, EP1581111A2, EP1292227A2, EP2332095A1, U.S. Pat. Nos. 7,184,581 and 7,251,351 to Idex, and WO/2000/048133A1, WO/2004/019262A1, WO/2000/042493A1, WO/2000/051084A1, WO/1997/036259A1, WO/2000/074566A1, WO/2001/038506A1, WO/2000/022581A1, WO/2000/011617A1, and WO/2001/018753A1 to Bromba Biometrics.

Various additional references for consideration include U.S. Pat. Nos. 5,434,398, 7,270,276, 7,506,165, 8,242,775, US20040019522, US20050240528, US20060065741, US20090045257, US20100181999, US20120318876, WO/2004/012052A2, WO/2005/109887A1, and WO/2013/109134A1.

Websites to consider for disclosing devices potentially in the same field of endeavor include: sonavation.com/technology/, www.asd0309.com/, www.asd0309.com/products/index.html#FPTS, www.fingerprints.com/, www.fingerprints.com/wp-content/uploads/2014/04/FPC1020-Product-Sheet_rev-D.pdf, www.fingerprints.com/technology/patents/, www.e-smart.com/, www.e-smart.com/products_ssc.html, www.youtube.com/watch?v=ONmb161SZzo, www.gemalto.com/, www.gemalto.com/products/dotnet_bio/index.html, www.gemalto.com/products/dotnet_bio/resources/technical_doc.html, www.matchoncard.com/, www.precisebiometrics.com/, www.precisebiometrics.com/match-on-card-for-enterprise, www.globalplatform.org/documents/BiometricWhitePaper_March09.pdf, www.oberthur.com/, www.networkproductsguide.com/innovations/2010/Oberthur-Technologies.html, csrc.nist.gov/groups/STM/cmvp/documents/140-1/140sp/140sp1414.pdf, www.smartmetric.com/, www.divacard.com/, www.divacard.com/html/components.html, www.cardlab.dk/, www.cardlab.dk/index.php?id=147, www.sic.ca/, www.sic.ca/proximity-cards/, www.sic.ca/wp-content/uploads/2014/02/S.I.C.-Biometrics-Healthcare-Overview-Offer.pdf, www.pinkey.it/en, www.card-tech.it/en, www.pinkey.it/en/smart, www.card-tech.it/files/pictures/prodotti/key_features_pinkey_smart_eng_rev_1.1.pdf, www.idex.no/, www.idex.no/#!/products/smartfinger/, www.idex.no/products/smartfinger/#!/technology/, www.idex.no/products/smartfinger/#!/technology/fingerprint-imaging-and-authentication/, www.embedx.com/, www.embedx.com/pdfs/bio_security/BIOMETRIC_SECURITY-PERSONAL_IDENTIFICATION_VERIFICATION.pdf, www.bromba.com/, www.bromba.com/tdmoc11e.htm, www.bromba.com/tdmoc20e.htm, www.plastc.com, bgr.com/2014/10/07/plastc-card-release-date-price-preorders/, www.getfinal.com/, bgr.com/2014/10/10/coin-vs-plastc-vs-final/, www.yankodesign.com/2009/10/22/all-in-one-credit-card/, www.smartcardsource.com/, www.smartcardsource.com/contents/en-ca/d9_JCOP-NXP-cards.html, www.smartcardsource.com/contents/en-ca/d23_fareone.html, www.basiccard.com!, www.zeitcontrol.de/en, www.watchdata.com/, www.watchdata.com/en/bank/products-smart.jsp, www.cpicardgroup.com/, www.cpicardgroup.com/why-choose-cpi-card-group, www.cpicardgroup.com/emv-cards, www.gi-de.com/en/, www.gi-de.com/en/products_and_solutions/solutions/emv_payment_solutions/emv-payment-solutions.jsp, www.gi-de.com/en/products_and_solutions/products/electronic_payment/electronic-payment.jsp, www.cryptomathic.com, www.cryptomathic.com/products/emv/cardink, www.emue.co/, www.emue.com/node/22.html, www.smartcardfocus.com/, and www.smartcardfocus.com/shop/ilp/se-44/cards-and-tags/p/index.shtml.

SUMMARY OF THE INVENTION

The smartcard of this invention is a credit card or ID card replacement which reduces and ideally prevents fraud. The card can use one or more fingerprints and another biometric signature such as the shape of the person's heartbeat to validate that the card owner is holding the card. The card will not communicate unless the biometric checks are passed. The teachings are extended to thumb drives and smartphones where other biometric identifiers can be used.

The smartcard can contain the only copy of a unique private encryption key. This key can be maintained in volatile RAM memory by a very long life battery. The card can be covered by a thin film which contains wires, which can be transparent, in a maze to create a chassis intrusion detector (CID). This CID verifies that the card has not been breached. If any of these wires is severed, as would necessarily happen if someone attempted to gain access to the circuitry within the card, the CID electronics can erase the private key and other stored data such as the owner's fingerprint, from the volatile memory and the card is thereafter useless.

When a card owner wishes to utilize the card for a purchase at a store, for example, he or she can present the card to a near field communications (NFC) reader, for the NFC implementation of the invention, which would communicate and provide power to the card. A magnetic stripe version of the smartcard will also be described below. The owner would hold the card in such a manner that his or her fingers are positioned above the fingerprint reading circuitry. The fingerprints are read optically, ultrasonically or capacitively and compared to previously stored fingerprints within the card's memory. The fingerprint information is never transmitted off of the card thus avoiding privacy or government surveillance concerns. Some people, such as miners and others who work with their hands, may have difficulties using the smartcard of this invention as they may not have well-defined fingerprints.

Biometrics also suffer from controversial margins of error, including false matches ('false positives'), or biometrics not being recognized ('false negatives'). Fingerprints have the highest error rate and these concerns will be addressed below. Criminals can also synthesize (or 'spoof') fingerprints and create fictional identities or hack other's identities. Electronic databases are also vulnerable to hacking, which can lead to biometric information being stolen, altered or even destroyed. Peoples' identities are compromised permanently when their biometrics are compromised, as they cannot replace their fingers, eyes or voices. All of these concerns are addressed and eliminated through practicing the teachings of this invention.

A heartbeat pulse shape can be simultaneously recorded. If the fingerprints and the heartbeat pulse shape match those stored in memory, then the card can transmit an identification number. The owner will also specify, as described below, the credit or debit card company which he or she wishes to use or other alternate payer. The NFC reader will then transmit the owner's ID to the chosen issuing card company, hereinafter called the credit card company, which upon receipt will encode a random number, or other information known only to the credit card company, using the public key corresponding to the owner's smartcard private key. The encoded information will then be transmitted to the NFC reader and then to the owner's smartcard which will decode the number and return the decoded number to the credit card company via the NFC reader. If the numbers match, then the transaction, assuming other conditions are met, can be authorized. Depending on the communication time, this entire process can take less than one second and requires no signature or pin number entry or secret credit card number.

Depending on the smartcard design, the credit card company can be chosen from a display on the card. Alternately the NFC reader can provide a touchpad, which can be part of the display, for entry of this information or it can be obtained by some other convenient method.

The smartcard owner can obtain his or her card from a trusted authority such as a bank, credit card company or government office. When the card is manufactured, it can have the private key entered into the card's memory or it can be added later. When the card is associated with a new owner, the owner's chosen ID will be associated with the public key portion of the encryption key pair. Multiple card companies can use the same public key; therefore, only one smartcard is needed to replace a number of credit cards or other identification cards. When the owner receives the card for the first time, he or she will initiate the card by providing the requisite fingerprints and heart pulse shape. The first time that the card reads these biometrics, they can be permanently stored within the card or stored in the card's volatile memory with the private key. From that point on, only the owner can use the smartcard. Thus, when the smartcard transmits the owner's ID, which can be the same ID for all credit card companies and need not be secret, the NFC reader will know positively that the card holder has passed the biometric checks. When the credit card company receives the owner's ID, it will encrypt a random number, or other data known only to the credit card company, and send that number or data, as described above, to the smartcard. Since the smartcard is the only device in the world which can decode the random number, and the smartcard will not communicate unless it is being held by the owner, fraud is prevented.

If the card is stolen, it is useless to the thief. If any of the communications between the card and the credit card company is intercepted, that information is useless to a hacker. The owner's ID need not be secret, only the private key is secret and that is protected and cannot be hacked and it never leaves the card. The owner's ID can be his/her credit card number in which case, it could be held as a secret but since this number is easily obtained by a thief, this would not degrade the security of the smartcard.

Not only can this smartcard be used for credit cards, it can also be used for any positive identification purpose using a similar protocol. Thus, passports, driver's licenses, voter registration cards, loyalty cards, club membership cards, door opening cards, vehicle key replacements, and many other applications are enabled by a single card which can only be used by the owner.

BRIEF DESCRIPTION OF THE DRAWINGS

The following drawings are illustrative of embodiments of the system developed or adapted using the teachings of at least one of the embodiments disclosed herein and are not meant to limit the scope of the disclosure as encompassed by the claims.

FIG. 4A is a cross-sectional view taken along the line 4A-4A in FIG. 4.

FIG. 4B is an enlarged view of the section designated 4B in FIG. 4A.

FIG. 5 is a schematic of the chassis intrusion detector electronics embedded within the smartcard.

FIG. 5A is the corresponding electronic circuit to the chassis intrusion detector electronics shown in FIG. 5.

FIG. 7 is an illustration of a preferred capacitance fingerprint reader in accordance with the invention.

FIG. 7A is a perspective view of the fingerprint reader shown in FIG. 7 partly broken away.

FIG. 7B is a cross-sectional view taken along the line 7B-7B in FIG. 7A.

FIG. 8 is an alternate implementation of some of the teachings of the invention applied to a thumb drive.

FIG. 8A is a section view of the CID film.

FIG. 8B shows top, side and bottom view of the thumb drive shown in FIG. 8.

FIG. 10A illustrates an ultrasonic fingerprint sensor.

FIG. 10B is a perspective view of the ultrasonic fingerprint reader shown in FIG. 10 partly broken away.

FIG. 10C is a cross-sectional view taken along the line 10C-10C in FIG. 10B.

FIGS. 11A, 11B, 11C, 11D, 11E illustrate the smartcard before (FIG. 11A), during (FIG. 11B) and after (FIGS. 11C-11E) assembly with various details shown.

BEST MODE FOR CARRYING OUT INVENTION

The present disclosure is directed at solving the problem of guaranteeing with a high degree of certainty that a credit, debit card, or other identification card, has not been hacked or stolen and that when it is presented for any purpose, the recipient of the information on the card can be certain that no fraud has occurred and that the person possessing or using the card is the owner of that card.

Figure 1:
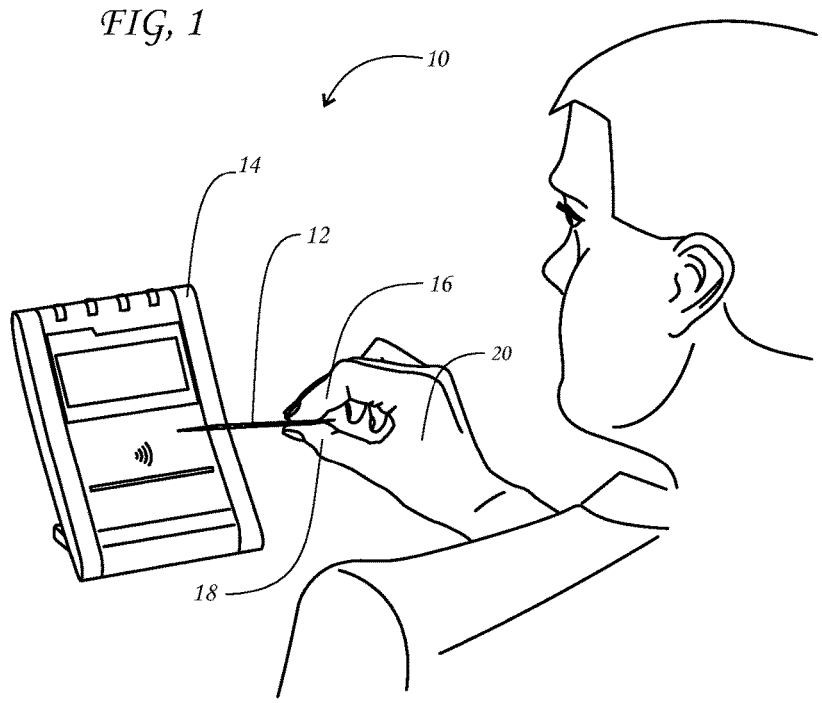
FIG. 1 illustrates the use of a smartcard in accordance with the invention with an NFC reader.

FIG. 1 illustrates the invention generally at 10 with the use of a smartcard 12 in accordance with the invention in conjunction with a Near Field Communications (NFC) reader 14. The card owner's hand 20 holds the card 12 using his or her thumb 18 and forefingers 16. Depending on the implementation, 1 or 2 forefingers 16 can be used. When held near the NFC reader 14, the card 12 will harvest power emitted from the card reader 14 and will use this power to charge a rechargeable battery to energize the electronics within the card 12. Optical, ultrasonic or capacitive fingerprint reading pads are provided on the top and bottom surfaces of the card 12 and when placed in proximity to the NFC reader 14, the fingerprints will be acquired as described herein. In some implementations, a heartbeat pulse shape from one or more of the fingers 16, 18 in contact with the card 12 will also be obtained in order to obtain an approximate electrocardiogram signature. The biometric fingerprint and/or heartbeat pulse shape will have been previously acquired by the card 12 when the card 12 was initially activated. When the card 12 is near reader 14, the newly acquired biometrics will be compared with those previously stored in the card's memory and if a match is obtained, then the card 12 will transmit an identification number corresponding to the card owner, which may be a credit card account number, to the NFC reader 14.

When the NFC reader obtains an identification number from the card 12, it will transmit this number to the point of sale terminal, not shown, which communicates with the card issuer. When the card issuer receives this identification number, it will retrieve from its memory the public key associated with that identification number and use that public key to encode a random number, or other data known only to the card issuer. The encoded data will then be transmitted to the POS terminal and from there to the NFC reader 14 and to the card 12. The card 12 will decode the encoded data and return the decoded data to the card issuer through the NFC reader 14 and the POS terminal. By this process, the card issuer can be confident that the proper owner is holding the issued card 12 and therefore the transaction may proceed.

When the card 12 is manufactured, a pair of cryptographic keys are created, a private key and a corresponding public key. The encryption level for these keys can be the highest allowed by law. The private key is then written to card 12 and the writing path can be severed so that once written, it cannot be rewritten or read from the exterior of the card 12. The severing of the data path step can be omitted as described below if the card is to be reused with a different private key. This will be the only location where the private key is recorded. Once written to the card 12, it is erased from the system which created it. The public key is retained and when the card 12 is issued to a new owner, the owner provides an identification number which thereafter is associated with this public key. This information can then be provided to any interested party and does not need to be secure or secret. The entire process described above can take place in one second or less depending on the bandwidth of the communication channel between the NFC reader 14 and the card issuer. Thus, the approval of a transaction not only is extremely secure and fraud resistant but is practically instantaneous and does not require a signature or pin entry by the card owner. As described below, additional information such as the transaction amount and the owner's approval thereof may also be communicated between the owner and card issuer.

Figure 2:
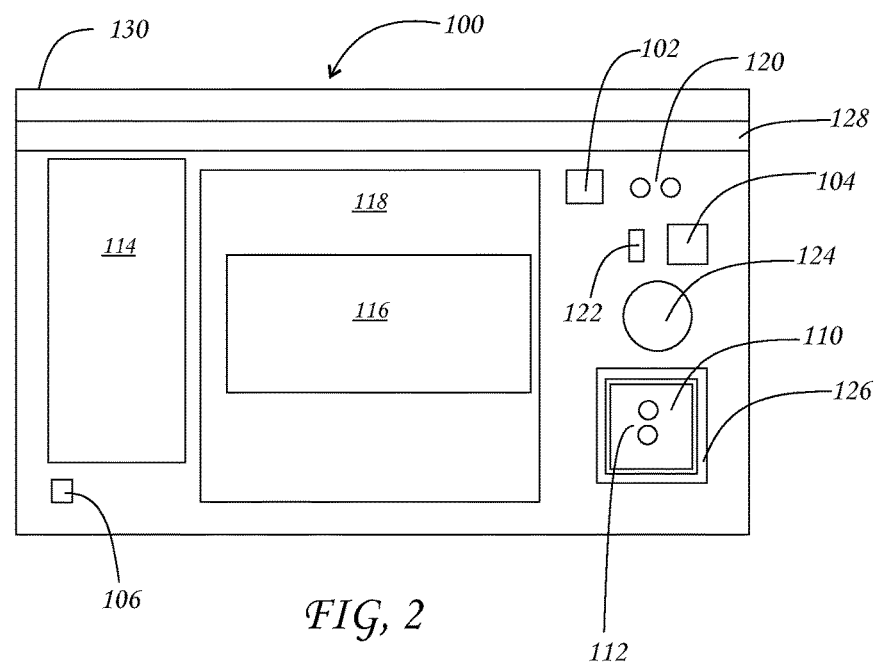
FIG. 2 illustrates a layout of a preferred smartcard of this invention.

FIG. 2 illustrates a layout of a preferred smartcard of this invention shown generally at 100. The positioning of the various elements is in no way intended to limit the invention.

The card includes a substrate 130 on which the elements described below are arranged, placed, positioned, embedded, mounted, integrated or incorporated or otherwise provided. The specific manner for placing the components on the substrate 130 is known to those skilled in the art to which this invention pertains or readily ascertainable in view of the disclosure herein.

A main processor is shown at 102, which can contain various forms of volatile and non-volatile memory including ROM, a near frequency communication chip at 104, a chassis intrusion detector (CID) microprocessor at 106, which contains the volatile memory holding the private key(s), and a CID battery at 114. A fingerprint reader is showing at 110 which can contain an ECG sensor 112. A primary or main rechargeable battery is seen at 116 and a display at 118. LEDs are shown at 120. An antenna designed to receive power from the NFC is showing at 122. This antenna can also be used to receive power for recharging the main battery 116 from an external device provided for that purpose. A touch input device is shown at 124; however, the display 118 can be designed to be a touch sensitive display obviating the need for the input device 124. A finger resistance sensor 126 can be provided as a check on whether the person using the card 110 has applied films to his fingers. An optional magnetic stripe is illustrated at 128. If this magnetic stripe 128 is present, then circuitry to read and program this stripe 128 would also be needed and would be placed, for example, below the stripe 128.

A high accuracy biometric identification of the card holder is accomplished using multiple fingerprint detectors or readers. Although only a single such detector or reader 110 is illustrated in FIG. 2, such detectors or readers can be placed on one side of the card 100 for acquiring one or more fingerprints and an additional fingerprint detector or reader can be placed on the opposite side of the card 100 to acquire the thumbprint. Additionally, the electrical resistance can be measured from finger to finger using the finger resistance sensor 126. This is to detect whether the card holder has applied films onto his or her fingers in an attempt to spoof the card 100 by using some other person's fingerprints.

Additionally the ECG sensor 112 can be made part of the fingerprint sensor to measure the shape of the heart pulse which can additionally be used as a biometric measure as reported in "Unveiling the Biometric Potential of Finger-Based ECG Signals" which can be found on the Internet at www.hindawi.com/journals/cin/2011/720971. A combination of these biometric measurements can provide a highly accurate test that the person who is holding the card 100 is the same person to whom the card 100 was initially given.

When first obtaining a smartcard of this invention, the owner would position his or her fingers on to the appropriate fingerprint readers 110 which would acquire the various biometric measures as discussed above. The data relative to these measurements is then stored in volatile or nonvolatile memory for use in comparing future biometric data acquisitions with the initial such acquisition. By using several such biometric measurements, the identification accuracy will be very high. As explained below, the data relative to the biometric measurements is protected with the CID preventing access to this data from outside of the card 100. The particular methods by which the biometric comparisons are made and the data is stored will be unique to this system and undiscoverable by anyone attempting to reverse engineer the card 100. All of this data and corresponding programs are destroyed, if held in the volatile memory, if the card 100 is breached as discussed below.

The fingerprint reader 110 can be either based on capacitive, ultrasonic or optical systems as discussed below. The display can be of a variety of shapes and technologies however and E-ink touchscreen is preferred. If the touchscreen is used, then input device 124 is unnecessary.

The card 100 may also include a Bluetooth and/or Wi-Fi communications capability, a flash memory for holding various card IDs or numbers, a rewritable magnetic strip and rewriting capability, and various other similar capabilities. The display can also be used as a fingerprint sensor as illustrated and described in U.S. Pat. Appln. Publ. No. 20050240778. One or more comparison techniques and/or technologies may be used for comparisons. For example, for fingerprint comparisons, the main processor 102 may utilize the stored data to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons as illustrated, for example, in U.S. Pat. No. 7,438,234. The present invention can use third-party fingerprint scanning and security devices such as those made by Interlink Electronics, Keytronic, Identix Biotouch, BIOmetriciD, on Click, and/or other third-party vendors.

The ECG sensor 112 results reported in: Lugovaya T. S. "Biometric human identification based on electrocardiogram". [Master's thesis] Faculty of Computing Technologies and Informatics, Electrotechnical University "LETI", Saint-Petersburg, Russian Federation; June 2005; Nemirko A. P., Lugovaya T. S. "Biometric human identification based on electrocardiogram." Proc. XII-th Russian Conference on Mathematical Methods of Pattern Recognition, Moscow, MAKS Press, 2005, pp. 387-390. ISBN 5-317-01445-X. And, André Lourenco, Hugo Silva and Ana Fred, "Unveiling the Biometric Potential of Finger-Based ECG Signals", June 2011, www.hindawi.com/journals/cin/2011/720971/. In these references, which are incorporated herein by reference, accuracies of from 94.3% to 96% are reported.

Figure 3:
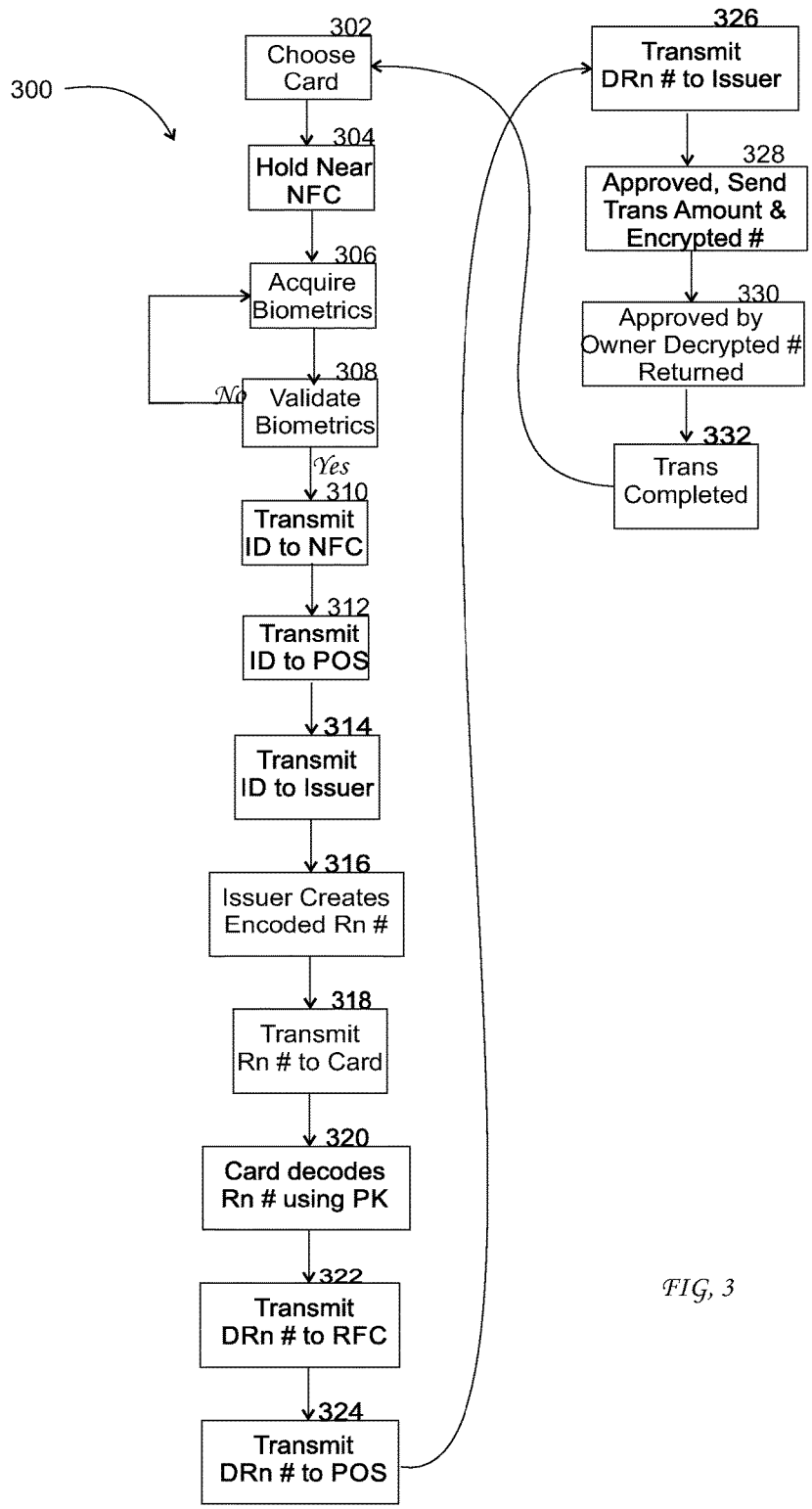
FIG. 3 is a flow chart illustrating the functioning of the smartcard system in accordance with the invention.

A flowchart illustrating the functioning of the smartcard system is shown at 300 in FIG. 3. The process is initiated when the owner selects a credit card, or other ID card, from the display 118 on the card 100 at step 302. The card owner positions his or her fingers over the fingerprint reading sections (reader(s) 110) on the card 100 and holds the card 100 near to the NFC reader, step 304. The NFC reader can provide power to the card 100, if it is needed, which allows the card 100 to acquire the biometrics, fingerprints and/or heartbeat shape at step 306. The newly acquired biometrics are compared with stored versions at step 308 and if they agree, control is passed to step 310. If the biometrics do not agree, control is returned to 306 and the biometrics are re-acquired. If the biometrics tests fail then, depending on the smartcard design, one of the LEDs 120 on the card 100 can be flashed or turned on to indicate to the cardholder that perhaps his fingers are not properly oriented relative to the fingerprint readers 110.

Upon successful validation of the biometrics, the card 100 transmits the owner's ID to the NFC at step 310 and the NFC in turn, transmits this ID to the point of sale terminal (POS), step 312. Similarly the POS terminal transmits the ID to the card issuer at step 314. At step 316, the issuer creates a random number, or other data known only to the card issuer, and encodes these data using the public key associated with the card owner's ID at step 316. This encoded data is then transmitted to the card 100 via the POS terminal and the NFC reader at step 318. The card 100 then decodes the encoded data using the stored private key in the memory associated with microprocessor 106 at step 320 and transmits the decoded data to the NFC at step 322 which in turn transmits it to the POS terminal at step 324 and then to the issuer at step 326. The actions performed by the card 100 may be performed or enabled by hardware and/or software on the card 100, e.g., by components including but not limited to the main processor 102 including memory in which software may be resident, the near frequency communication chip 104, the CID microprocessor 106 having the memory in which the private key is stored, the main battery 116, and antenna 122.

Additional information such as the amount of the purchase and any other relative information can simultaneously be passed to the issuer from the POS terminal as needed. This additional information may influence the approval of the transaction; however, at this point if the decoded data agrees with the original data, then the issuer knows that they owner is in possession of his or her card. The issuer now can encode the transaction amount and send it by the same path to the card at step 328 where it is displayed on display 118 on the card 100 for owner approval. The issuer can, at the same time, encode a second random number which is also sent to the smartcard 100. When the smartcard 100 receives this second random number, it decodes it using the private key in the memory associate with the microprocessor 106 and associates this decoded number with the approval key on the smart card 100. If the owner approves the amount, he or she presses an approval key, which can be on the display 118 or elsewhere on the card 100, at step 330 and the decoded random number is returned to the card issuer. If this corresponds to the original number, then the issuer can approve the transaction to the POS terminal and the transaction is complete at step 332. After the transaction is completed at step 332, control is returned to the original step 302.

The owner's ID discussed above can be a single number or other text identifier associated with the owner and perhaps indicating the smartcard system being used or it can be a credit card number, a passport number, driver's license number, SS number, or any other authorization number. The particular identifier used can be chosen by the owner at the time of use.

By the added step of the second random number, the issuer knows that the owner has approved the amount of the transaction as approved by the issuer and that this amount has not been altered by an intermediary having access to the transaction stream.

Also although a single private key is contemplated in a preferred implementation of this invention, multiple private keys can be stored in the memory associated with the microprocessor 106, each corresponding to a card issuer. The appropriate private key can then be selected at the time the card issuer is selected. All can similarly be erased if an intrusion is detected. This use of a private key falls under the general heading of a "challenge/response" system in the literature. The particular system used herein is simpler than others. Other more complicated algorithms can of course be implemented within the teachings of this invention. For example, it is assumed that the integrity of the issuer need not be verified. If this is not the case, then a parallel system as discussed herein can be implemented.

Figure 4:
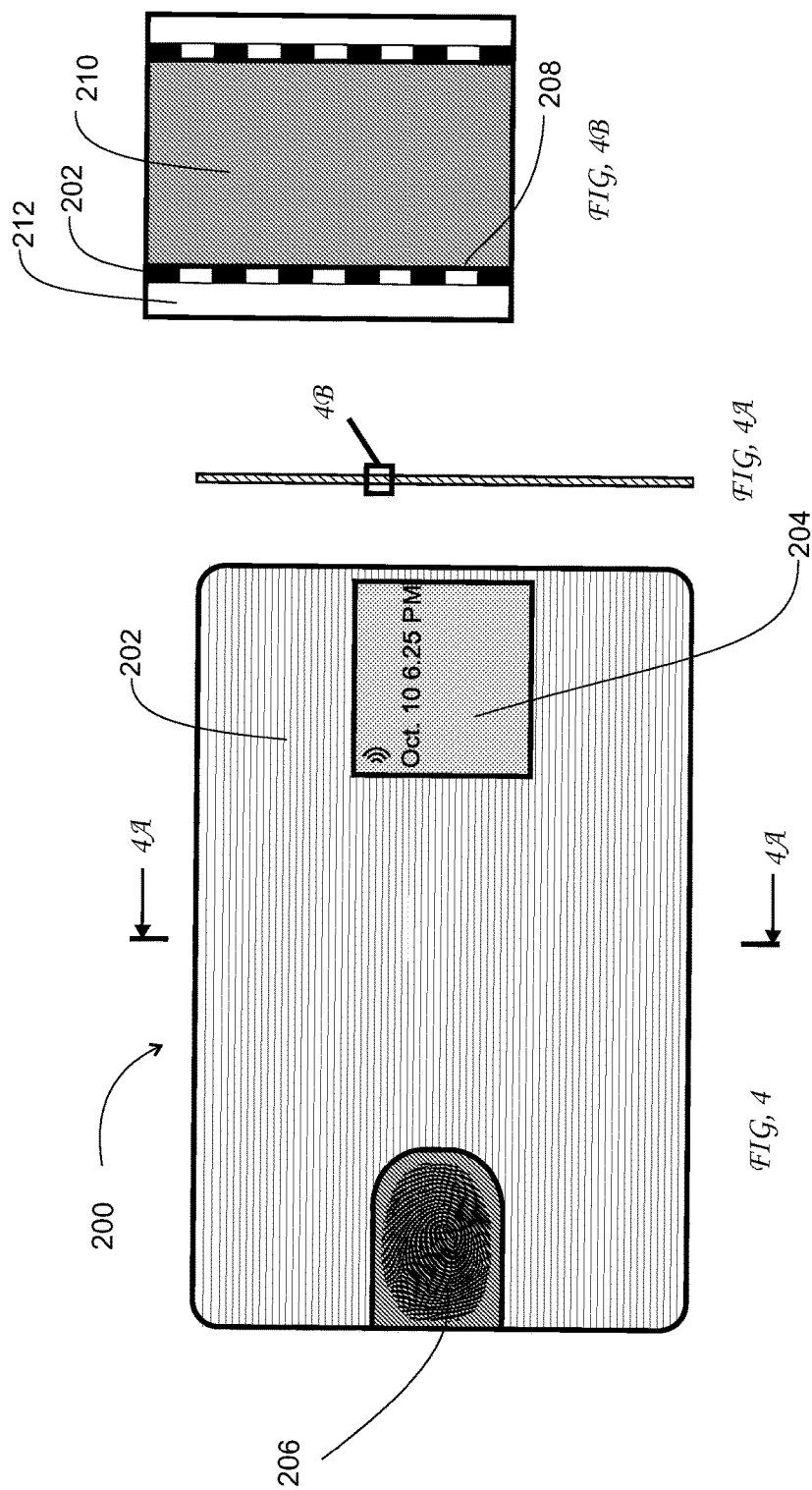
FIG. 4 is a drawing illustrating a smartcard with a preferred chassis intrusion detector used in the invention.

FIG. 4 is a drawing illustrating a smartcard 200 with a preferred chassis intrusion detector (CID) used in the invention. The card 200 is covered with a series of parallel straight line conductors 202 which are spaced apart from each other. In another preferred implementation, wavy lines are used as conductors. The conductors 202 are connected together to form a completed transmission line where a current can pass to form a single complete circuit that totally engulfs the card 200. As shown in this implementation, the conductors 202 are printed onto a thin film of plastic 208 which is bonded or otherwise attached to the outside of the card 200 and protected with a protective plastic layer 212. The interior of the card 200 is represented at 210 in FIG. 4B. Although not illustrated, the conductors 202 wrap around the edges of the card, however, they may not cover a fingerprint sensor 206 and/or a display 204. Fingerprint sensor 206 is representative of a biometric data entry device.

The interior 210 of the card 200 may be a substrate on which the remaining components, e.g., those shown schematically in FIG. 1, are mounted. The components may also be integrated or incorporated into the substrate.

In the illustration, the conductive lines are shown to be straight and opaque. In one preferred application, the lines are made wavy and sufficiently thin that they are transparent. In this case, they are able to extend across the display 204. The fingerprint sensor 206 can also be covered when the wires are transparent when an optical fingerprint sensor is used. The wires can be printed from a variety of conductive materials such as aluminum, copper, indium tin oxide, and carbon-based materials such as graphene. As described below, these wires are connected so as to form a continuous circuit that totally surrounds the smartcard 200. If any of these wires is broken such that the circuit no longer conducts electricity, then this fact is sensed by the CID circuitry (microprocessor 106) which erases the private key(s) stored in its memory. It also can cause the stored biometric information to be similarly erased.

As an alternative to the wires used in FIG. 4, two layers of conductive material separated by a thin film can create a capacitor which also could be used to detect a breach in the surface of the card. These conductive films can be made of indium tin oxide and be transparent. Since a carefully placed hole or multiple holes through the plastic film assembly can cause only a minor change in the capacitance, a preferred alternative construction, as illustrated in FIG. 4, is to replace the two conductive layers and separating plastic film with a single layer comprising a labyrinth of wires which are very narrow and closely spaced such that any attempt to penetrate the film will cause one or more of these wires to be cut. The microprocessor therefore monitors the total resistance, inductance or mutual inductance of this circuit and erases the private key in memory associated with microprocessor 106 if there is a significant change in these measurements. Even the shorting of a subset of these wires accompanying an attempt to open an access hole without braking the circuit is detectable by the monitoring circuit.

Since any attempt to break into the electronic and sensor assembly, that is the card, will necessarily sever one of these wires or change the circuit resistance, this design provides an easily detectable method of determining an attempt to intrude into the system electronics and sensor assembly or card.

A schematic of the chassis intrusion detector system is shown in FIG. 5 generally at 400. Power to operate the circuit can be supplied from a rechargeable battery or an external device such as the NFC through a wire 410 to an antenna 412 which couples to the NFC reader, not shown. Wire 410 also provides communication from the electronics and sensors assembly of which the security assembly (SA) 404 is a part. The fine wire maze is shown schematically at 402, the SA at 404, a long life battery at 408 and a RAM volatile memory at 406. The long life battery 408 is present to provide sufficient power to operate the SA 404 for the life of the card, typically 5-10 years.

The SA 404 can be a separate subassembly which is further protected by being potted with a material such that any attempt to obtain access to the wires connecting the battery 408 to a microprocessor 414 therein or to the RAM memory 406 would be broken during such an attempt. This is a secondary precaution since penetration to the SA 404 should not be possible without breaking wire 402 and thus destroying the private key. This private key can be destroyed if it is resident on volatile RAM memory and power is removed from this memory. The power can be removed by the microprocessor 414.

To summarize, any disruption of the mesh or conductive film in either of the above described examples will destroy the private key in the memory associated with a chassis intrusion detector (CID) microprocessor making it impossible to decode the data sent from the card issuer who will therefore deny transaction approval. After the assembly is completed, the microprocessor 414 can be powered on and the first step will be to measure the inductance, resistance, and capacitance, as appropriate, of the mesh or films. Thereafter, if any of these measurements significantly change, then the circuit in the SA 404 would remove power from the RAM memory 406 thereby destroying the private key(s). Since a particular private key cannot be reloaded since it was the only copy in existence, the assembly would need to be returned to the issuer for the insertion of a new private key or the card discarded.

When the SA 404 is loaded with the private key during manufacture or thereafter, it can be done so through two fused links, not shown, which can be broken after the loading process has occurred and been verified. Thereafter, the private key memory location cannot be accessed from outside of the card, and cannot be changed or reloaded.

FIG. 5A illustrates the circuit of the smartcard containing the SA 404 generally at 500. The smartcard is illustrated at 502 and the SA microcomputer and RAM at 520 and 518, respectively. The long life battery that powers the SA for several years is illustrated at 516, 514 is a signal that indicates that power is available from the card 502. This power can be supplied by a rechargeable battery located on the card or by the NFC reader through an antenna, not showing, on the smartcard 502. The system is designed such that if power is available from the smartcard 502, its voltage will be higher than that from the battery 516 and therefore the total power needed to supply the microprocessor 520 will come from the external source.

In this manner, the battery 516 has its life extended. Bidirectional serial communication takes place through wire 504. The testing pulse is imposed on the mesh 506 through wire 510 labeled a. The returned signal comes through wire 512 labeled b. The pulse at a is shown at 522 and consists of a 20 μs burst which is repeated every second, or at some other convenient value. The signal indicated by the trace 524 illustrates the integrity of the mesh 506 at the beginning where it responds with an attenuated 20 μs pulse; however, after the one second when the second pulse arrived and was not sensed by the microprocessor 520, b did not register a corresponding pulse indicating that the wire mesh 506 had been severed.

Signal 526 indicates that the private key is present in the RAM and due to the failure of the mesh 506 at the second burst pulse, the RAM was cleared. Trace 528 indicates that a message was sent to the card indicating that intrusion had taken place.

Figure 5B:
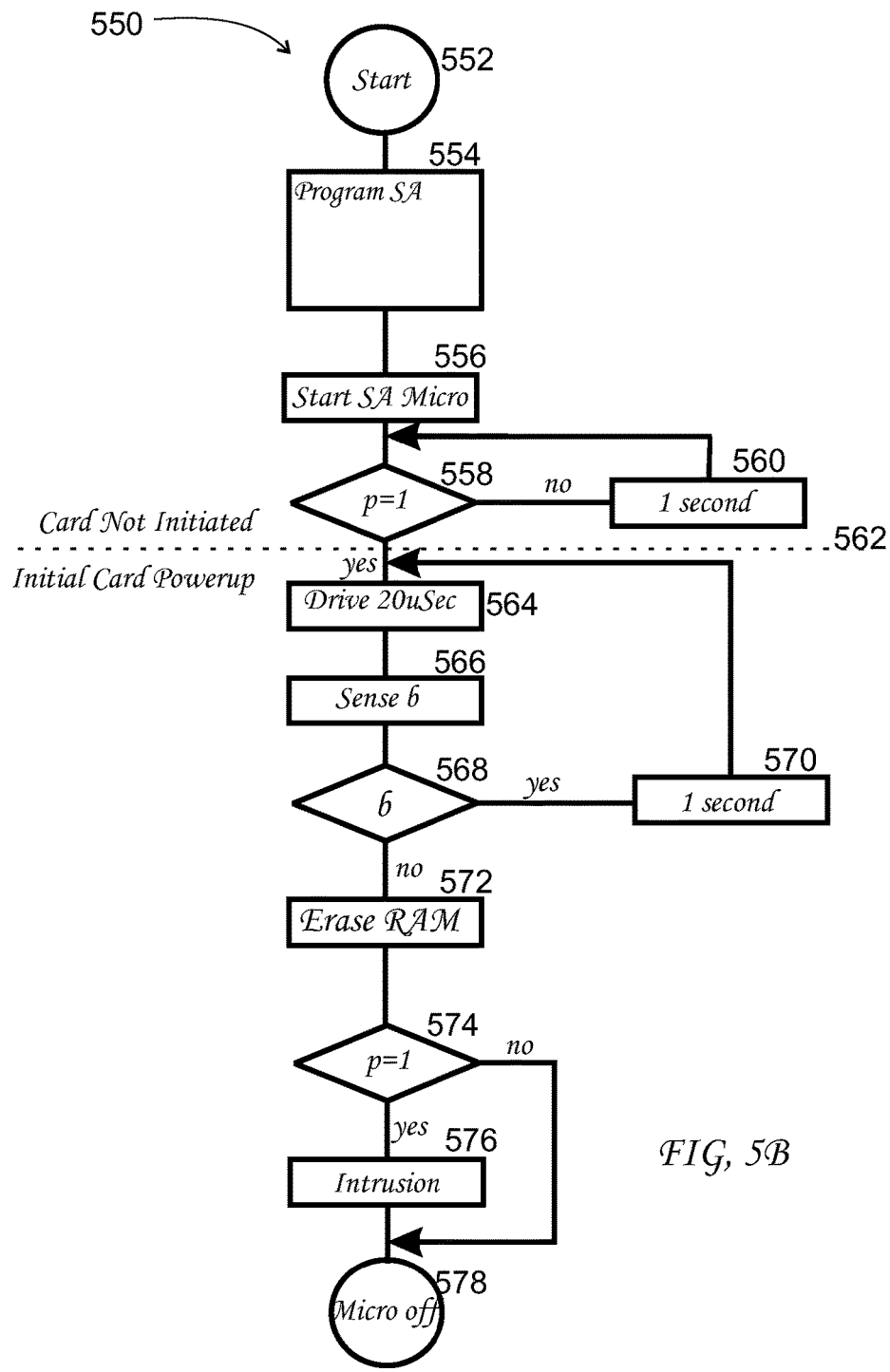
FIG. 5B is a flowchart explaining operation of the electronic circuit to the chassis intrusion detector electronics shown in FIG. 5.

A flowchart of this process is showing generally at 550 in FIG. 5B. The process starts at step 552 and at step 554, the microprocessor in the SA is programmed and the private key is loaded into RAM. If the card is designed so that the private key can only be loaded once, then the fuses are also blown at step 554. The power available indicator P is then set to zero indicating that the smartcard rechargeable battery has not been charged nor is the smartcard receiving energy from another external source such as the near field reader. Note that the same antenna which harvests power from the near field reader can be used to receive power from any charging source which is available.

At step 556, the SA microprocessor is started, however the every one second pulses will not be initiated. This is to conserve power of the SA battery while the smartcard is not in use. The smartcard will be vulnerable to the theft of the private key during this period, however, and the card issuer may choose to initiate the pulse per second as soon as the private key is loaded into RAM. Alternatively, the cards can be manufactured and the private key loaded just prior to the card being given to its new owner. In either case, the sensing of power from the smartcard indicated here as P equals one, is used to initiate the once per second pulses have started. This is indicated by the dashed line 562.

At step 564, the 20 μs pulse is driven onto conductor a and conductor b is tested for the presence of the signal at step 566. If conductor b received the pulse indicating that the integrity of the wire mesh is intact, the decision is made at step 568 to transfer control to step 570 where the one second delay occurs after which control is transferred back to step 564. If no signal was sensed on b, then step 568 transfers to control to step 572 where the private key and any other information is erased from RAM. Control is then transferred to step 574 where a check is made as to whether power is available from the smartcard and if so a message "intrusion" is sent to the smartcard at 576. In either case, the process terminates at step 578 where the microprocessor is turned off.

Figure 6:
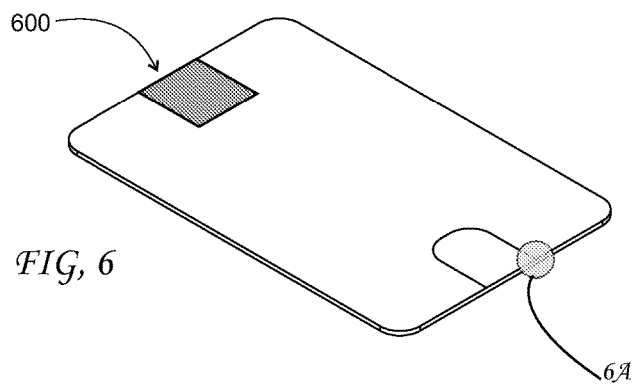
FIG. 6 is an illustration of a preferred optical fingerprint reader.
Figure 6A:
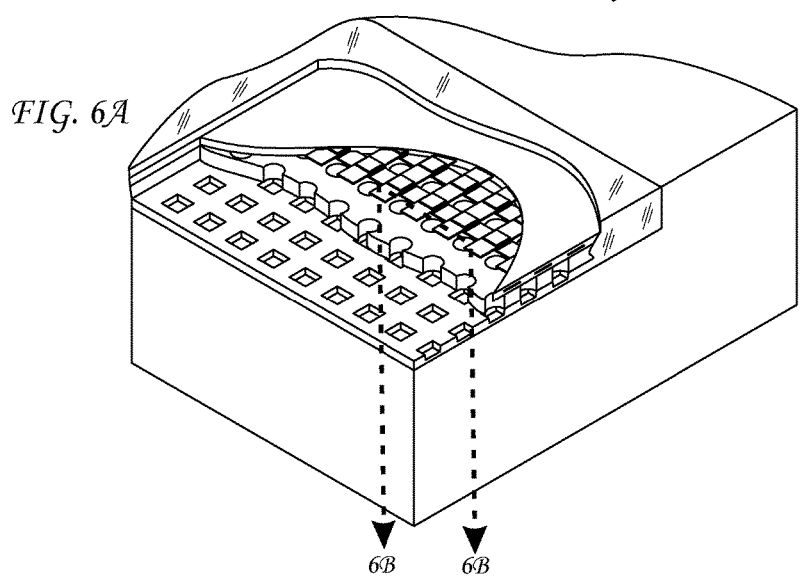
FIG. 6A is a detail of the cross section.
Figure 6B:
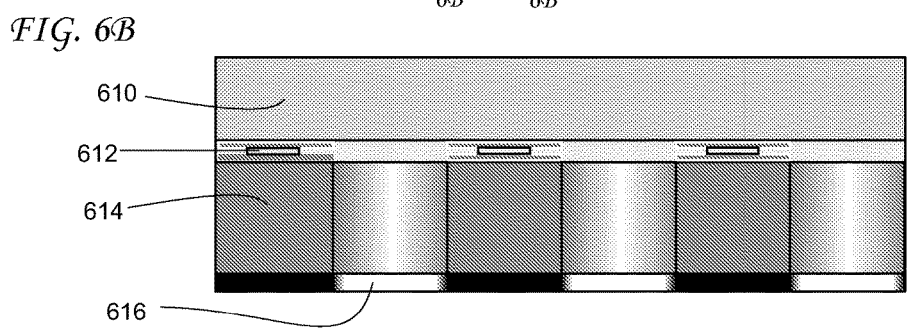
FIG. 6B is a further expanded detail of the reader.

FIG. 6 is an illustration of a preferred optical fingerprint reader shown generally at 600. FIG. 6A is a section of the fingerprint reader taken at 6A and FIG. 6B is a cross-section of the fingerprint reader taken along lines 6B-6B of FIG. 6A. The slim optical fingerprint scanner (reader), is comprised of four layers. The top layer 610 is made from glass or hard plastic and should be thick enough to ensure complete illumination of the upper surface (touching a finger) with rays diverging from separate light sources. Below, the top layer, the second layer 612 is a transparent OLED or similar light emitting display. In general, this display is a set of discrete light-emitting diodes. The emissive electroluminescent layer is made of a film of organic compound, emitting light in response to an electric current. This layer of organic semiconductor is located between two electrodes, where at least the upper electrode is transparent. In the present scanner, the display is used to illuminate the finger surface only. Essentially, it must be transparent. Such displays have been developed in industry (www.extremetech.com/computing/186241-lgs-flexible-and-transparent-oled-displays-are-the-beginning-of-the-e-paper-revolution). To decrease the cost, a monochrome display may be used.

Below the second layer 612, the next layer 614 is a non-transparent plate with micro-diaphragms and having a light-absorbing coating. This plate can be manufactured of any suitable material known to those skilled in the art to which this invention pertains in view of the disclosure herein. Its principal function is to prevent the mixing of light, reflecting or scattering from neighboring fragments of the finger. One company, specializing on microhole drilling, can be found at www.potomac-laser.com/services/core/micro-hole-drilling/.

Below the layer 614, the final layer 616 is the image detector and can be made from CCD or CMOS pixels. Each pixel of the detector should catch the rays from the finger's area, located directly opposite the pixel. The image sensor may be monochrome like the OLED. The pixel's size should be approximately equal to a diameter of the micro-diaphragm, e.g. from about 25 micrometers to about 50 micrometers. The image detector size corresponds to the fingerprint area (typically, APS-C format or smaller). Such a configuration can provide resolution of from about 500 dpi to about 1000 dpi.

FIG. 7 is an illustration of a preferred capacitance fingerprint reader shown generally at 700 as illustrated in U.S. Pat. No. 7,084,642. A dielectric layer 702 is covered by a sensitive surface 704 where a finger is pressed and two of the coplanar capacitor plates at 706 and 708. The sensitive area of modern capacitance fingerprint readers is typically less than 1 inch in diagonal, for example: www.camabio.com/product/m17_sectionid/4/m17_mageid/37/index.html
www.zvetcobiometrics.com/Products/P6500/features.php
www.ewallpk.com/index.php?id_product=58&controller=product&id_lang=1

Capacitance fingerprint sensors are more widely used while many manufactured optical sensors (CCD and CMOS) are available with much larger sensitive areas. To summarize, capacitive sensors are: relatively low cost (currently, widely used in mobile phones); insensitive to ambient lighting; resistant to contamination; acceptable resolution (for example, resolution in iPhone is 500 dpi, that is the minimum resolution for FBI-compliant scanners); hut, then have limited sensitive area.

Probably, most of manufactured optical fingerprint readers are based on frustrated total internal reflection (FTIR), i.e. the light entering the prism is reflected at the valleys, and randomly scattered (absorbed) at the ridges. The lack of reflection allows the ridges (which appear dark in the picture) to be differentiated from the valleys (appearing bright). Advantages are that: it is a verified technology; more accurate than capacitive sensors, resolution of about 1000 dpi and even greater is feasible; big sensing area (for example, the HiScan Fingerprint Scanner's area is 1 inch per 1 inch, www.biometrika.it/eng/hiscan.html). But in general, "classical" optical sensors contain light source(s), a lens objective, glass prism (plate) and a sensor, therefore, they are not slim; require to apply costly light-sensitive sensor (CCD or CMOS matrix); may be affected by stray light and/or surface contamination; need additional efforts to be resistant to deception.

Alternatives to "classical" optical sensors are solid-state optical sensors. In electro-optical sensors, a voltage across a light-emitting polymer film is applied. This polymer film can be coupled directly to an optical detector. When a finger is presented, ridges provide a ground to the polymer surface, creating a small current that generates light, Fingerprint valleys remain dark. Thus, a high contrast image can be produced. This is discussed in U.S. Pat. Appln. Publ, 20020131001. "Electro-optical device having an ITO layer, a SiN layer and an intermediate silicon oxide layer", incorporated by reference herein.

Other interesting sensor types are based on combination of various technologies, but they are at a development or laboratory stage including silicon chips with capacitance and capacitance with TFT. An ultrasonic based fingerprint sensor is discussed below.

Fingerprint sensors are continuing to improve and to be able to use more of the finger than just the ridges and valleys of the fingerprint. For example, the fingerprint technology provided by www.lumidigm.com/, a US-based biometric authentication solutions company, is able to identify optical characteristics of subsurface skin which is highly variable between one person and another. It does this using different spectrums of light and advanced optical methods. It is probably premature to consider this for smartcard applications, though it may be applicable for the smartphone application discussed below.

Other biometrics can in some cases be incorporated into a smartcard and in all cases into a smart phone with suitable attached sensors. These include: the user's voice, facial features, ear features, sound signature, handwriting signature, vascular patterns, DNA, hand geometry, smell, keystroke/typing features, iris, retina, and brainwaves.

FIG. 8 is a perspective view of two sides of an alternate implementation of some of the teachings of the invention applied to a USB thumb drive shown generally at 800. The finger and thumb prints sensors are shown at 802 and the USB connector at 804. The CID film is shown in an expanded view in FIG. 8A. Although this film is shown with straight conductors and on the surface of the thumb drive body, the conductors can, and are preferred to be, wavy conductors and to be embedded within the plastic body (as disclosed above). Although not shown, the CID film surrounds all of the electronics within the thumb drive 800 where the electronics are connected to the USB connector through two wires which exit the body of the thumb drive 800 though the CID film. FIG. 8B shows a plane view of the top, side and bottom of the thumb drive 800.

There are many opportunities for using such a thumb drive 800. When coupled with the appropriate cloud-based program, the thumb drive 800 can facilitate automatic logins to various password-protected websites. The cloud-based program can verify that the thumb drive is resident on the computer accessing the cloud-based program by virtue of the finger and thumb print authentication plus the private key challenge mechanism. The owner can securely use the thumb drive 800 in any computer to conduct ordering or banking transactions among others. Thus, with the thumb drive 800, the owner need no longer be concerned with remembering passwords and pins. Similarly, credit card and other security-based information can be automatically transferred from the cloud-based program to the accessed website.

Instead of a USB connection, the thumb drive 800 in the form of a fob can be used to automatically unlock doors and similar functions.

As with the smart card, the CID microprocessor in the thumb drive 800 can check the fine mesh for breach of security at various time intervals. The security ID, or private key, is stored in the microprocessor RAM. If there is a breach of security, the microprocessor erases the information stored in the RAM. The microprocessor is powered by an internal battery when external power is not available. The battery is designed to operate for many years and, since there is more space available, provision can be made for a rechargeable battery if desired.

In a recent paper "get your hands off my laptop" available at www.tau.ac.il/~tromer/papers/handsoff-20140731.pdf, the authors demonstrated that frequently private keys stored within a laptop can be extracted with some relatively simple methods. Since the private key is resonant on the thumb drive, these types of attacks are eliminated.

Although the fingerprint sensors are resonant on the thumb drive, for cases where biometric sensors also exists on a laptop, for example, even greater security can be realized by combining these two biometric systems.

Figure 9A:
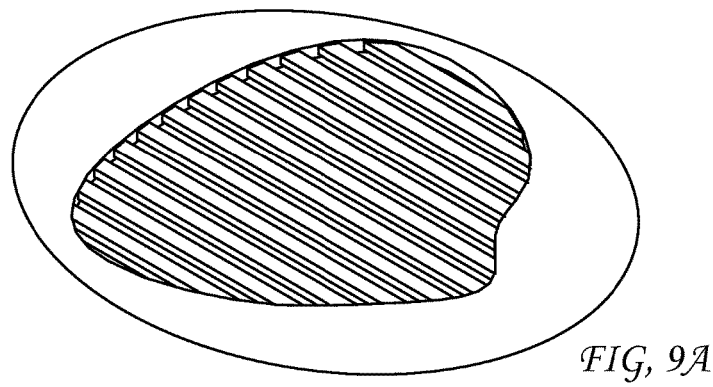
FIG. 9A is a perspective view, partly broken away of the CID film on the smartphone shown in FIG. 9.
Figure 9:
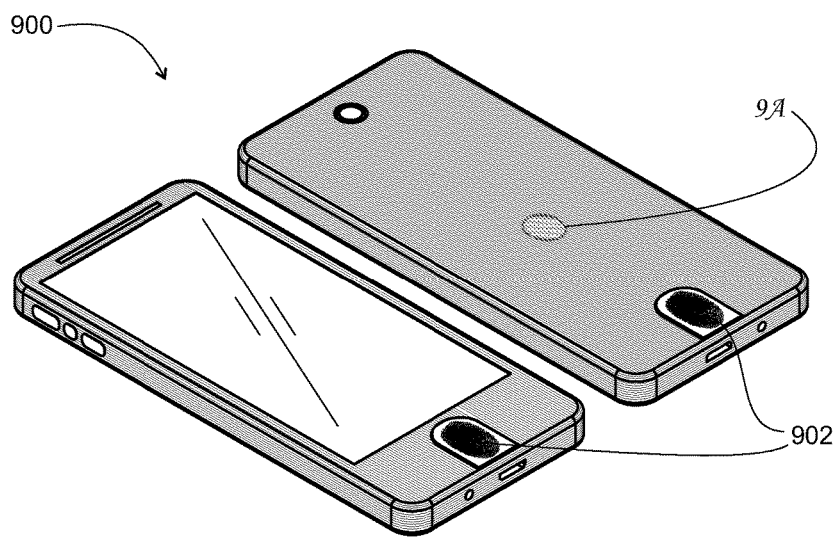
FIG. 9 is an alternate implementation of some of the teachings of the invention applied to a smartphone.

FIG. 9 is an alternate implementation of some of the teachings of the invention applied to a smartphone showing generally at 900. The fingerprint sensors on both sides of the smartphone are showing at 902. The mesh associated with the CID is seen at FIG. 9A and the embedded wires are preferably wavy and buried beneath the surface of the device. This mesh can be on top of the display providing the electrical conductors are transparent. Such transparency can be achieved by using indium tin oxide or by making the conductors very fine or very narrow. In these cases, the conductors can cover the display. However, since the display is used for multiple finger inputs, in many cases the CID film will reside on the back side of the display.

Depending on how much of the smart phone is to be protected, an alternate solution is to place within the smart phone a device of a similar size as the thumb drive described above which incorporates the private key and is protected by a CID.

FIGS. 10A, 10B and 10C illustrate an ultrasonic fingerprint sensor as marketed by Sonavation sonavation.com/technology/. The technology is showing generally at 1000 and is based on a large number of ultrasonic transducers 1002 (see FIG. 10C). Disclosure about Sonovation's system is found in U.S. Pat. Nos. 7,489,066, 8,515,135, US 20090279746, US 20100237992, U.S. Pat. Nos. 8,433,110, 8,805,031, WO/2014/124167A1 and JP2009205688A.

FIG. 11A illustrates the smartcard before assembly. FIG. 11B illustrates partial assembly after the chassis intrusion detector (CID) film (mesh 1104, 1106) has been applied to the base card. A detail taken at 11C-11C is shown in FIG. 11C and illustrates that there are elongated holes in the base card which surround the display and the fingerprint sensor. This allows the CID film to seal to itself in areas around the display and the fingerprint sensor to prevent a hacker from getting into the card electronics through the display or fingerprint sensors. FIG. 11D illustrates the assembled card where the CID film covered base card is smaller than the final card assembly allowing the CID film to seal to itself in a manner which completely circumnavigates the base card. This is illustrated in the detail shown in FIG. 11E taken along lines 11E-11E of FIG. 11D.

In this implementation, the mesh 1104, 1106 is placed over the entire carrier board prior to the application of the top 1110 and bottom 1102 covers which complete the card manufacture. These covers 1102, 1110 can either be laminated on top and bottom of the carrier board 1108 or the carrier board 1108 can be over-molded by an injection molding process. The carrier board 1108 is made smaller than the final card size as illustrated in FIG. 11E so as to permit the CID film to extend beyond the carrier board 1108 and be sealed to itself.

Holes 1126 are also placed in the base board 1122 to permit the CID film 1124 to again be sealed to itself through such holes. In particular, the display is attached to the base board by a few thin bridges with space 1126 between bridges again for the CID film self-bonding. When the card is completed through lamination or injection molding, it becomes nearly impossible to gain access to the private key storage without breaking one or more of the fine conductors which make up the CID film. Additionally, these conductors can be constructed in such a manner that if the card plastic is dissolved by a solvent, the conductors will similarly be dissolved thereby severing the CID circuit and causing the contents of the CID volatile memory to be erased.

In this implementation, the CID film does not cover the display due to the risk that one or more of the conductors may be worn through by the owner's fingers through prolonged use.

In addition to those applications discussed above the technology disclosed herein following areas:
1. Bank & Credit Cards
2. Voter ID
3. E-voting over Internet
4. Access to an account such as by an ATI (e.g., credit, charge debit, checking, savings, reward, loyalty, travel or the like)
5. Entry into buildings
6. Passports
7. Google Glass version to secure internal electronics
8. Bitcoin or other Electronic wallet
9. All Government ID's
10. Social Security Card
11. Birth Certificate
12. Driver's License
13. Port ID
14. Pilot's License
15. HAZMAT & Explosives (ATF) License
16. Medical Info Card
17. Insurance Card
18. Student ID card
19. School Services Card
20. Computer Access
21. Public transportation Passes
22. Toll & Parking Passes
23. E-Payment Card
24. Government Benefit & Employment
25. Payment Card
26. Government & Business Access & Security Clearance
27. Visa or Entry/Exit Pass with Infectious Disease Info There is a growing backlash by retailers against the 2-3% credit card charges. Since the cost of fraud has been essentially eliminated with the smartcard of this invention, these fees can now be substantially reduced. Alternatively, a new channel can now be put in place whereby the 2-3% fee is eliminated and the store provides a discount if the customer, for example, elects to use a direct bank transfer or substitute card which does not require the fee.

Finally, all patents, patent application publications and non-patent material identified above are incorporated by reference herein. The features disclosed in this material may be used in the invention to the extent possible.

The invention claimed is:

1. A card, comprising:
a substrate having first and second opposite sides,
at least one biometric data entry device on said first side of said substrate to receive biometric data about an individual engaging with said at least one biometric data entry device;
at least one memory component on said substrate and containing biometric data about an individual authorized to use the card and at least one private key;
a processor configured to compare biometric data received via said at least one biometric data entry device to biometric data contained in said at least one memory component to determine whether they match and when they match, initiate a process requiring use of the at least one private key for authorized use of the card;
a chassis intrusion detector system that detects tampering with the card and upon such detection, causes erasure or deletion of the at least one private key in said at least one memory component to thereby prevent unauthorized use of the card,
said chassis intrusion detector system comprising conductors spaced apart from each other over both said first and second sides of said substrate,
said conductors being electronically connected together to form a transmission line, whereby breaking of one of said conductors causes variation of current through the transmission line,
said processor being configured to erase or delete the at least one private key upon detecting a variance in current through the transmission line defined by said conductors caused by breaking of one of said conductors; and
a protective cover comprising:
a top cover on said first side of said substrate over a portion of said chassis intrusion detector system on said first side of said substrate, said top cover including a respective opening aligning with said at least one biometric data entry device, and
a bottom cover on said second side of said substrate over a portion of said chassis intrusion detector system on said second side of said substrate such that said substrate and said chassis intrusion detector system are between said top and bottom covers.

2. The card of claim 1, wherein said processor is configured to initiate the process, when the biometric data received via said at least one biometric data entry device matches the biometric data contained in said at least one memory component, which includes transmission of an identification number associated with the card and the card is a credit or debit card such that the identification number transmitted when the biometric data received via said at least one biometric data entry device matches the biometric data contained in said at least one memory component is a credit or debit card number.

3. The card of claim 2, wherein said processor is further configured to decode data, encoded based on a public key generated from the transmitted identification number, using the at least one private key in said at least one memory component whereby unless decoded using the at least one private key, the card is unusable.

4. The card of claim 1, wherein said processor is configured to initiate the process, when the biometric data received via said at least one biometric data entry device matches the biometric data contained in said at least one memory component, which includes transmission of an identification number associated with the card and the card is an identification card such that the identification number transmitted when the biometric data received via said at least one biometric data entry device matches the biometric data contained in said at least one memory component is a unique identification associated with an owner of the card.

5. The card of claim 1, further comprising:
an energy harvesting system arranged on said substrate to obtaining energy wirelessly from an external source based on proximity of said energy harvesting system to the external source; and
a battery on said substrate that is charged by said energy harvesting system.

6. The card of claim 5, wherein said energy harvesting system is configured to interact with a Near Field Communications (NFC) reader.

7. The card of claim 1, wherein said top cover and said bottom cover are laminated onto said substrate when covered by said chassis intrusion detector system.

8. The card of claim 1, wherein said at least one biometric data entry device comprises a single fingerprint reader.

9. The card of claim 1, wherein said at least one biometric data entry device comprises a first fingerprint reader, the card further comprising:
- a second fingerprint reader on said second side of said substrate to receive fingerprint data about an individual engaging with said second fingerprint reader; and
- a finger resistance sensor adapted to determine contact between fingers and said first and second fingerprint readers.

10. The card of claim 1, wherein said at least one biometric data entry device comprises a heartbeat detector.

11. The card of claim 1, further comprising a display arranged on said first side of said substrate, said conductors being configured not to cover said display, said top cover including an additional opening aligning with said display.

12. The card of claim 1, wherein said protective cover comprises a protective layer over said conductors such that said conductors are between said protective layer and said substrate and said protective layer forms an outermost, exposed surface of the card.

13. The card of claim 1, wherein said chassis intrusion detector system further comprises plastic film arranged on said first and second sides of said substrate, said conductors being formed on said plastic film.

14. The card of claim 1, wherein said conductors are parallel to one another.

15. The card of claim 1, wherein said conductors are made of transparent material.

16. A method for validating use of a card by an authorized user, comprising:
- prior to use of the card, placing biometric data of the authorized user into at least one memory component on the card along with at least one private key required for authorized use of the card, the at least one private key being contained in the at least one memory component on the card;
- receiving via at least one biometric data entry device on a first side of a substrate in the card, biometric data about an individual engaging with the at least one biometric data entry device, the substrate having a second side opposite the first side;
- comparing, via a processor on the card, biometric data received via the at least one biometric data entry device to biometric data contained in the at least one memory component to determine whether they match and when they match, initiating a process requiring use of the at least one private key for authorized use of the card;
- enclosing the substrate with a chassis intrusion detector system that detects tampering, the chassis intrusion detector system comprising conductors spaced apart from each other over the first and second sides of the substrate;
- covering the chassis intrusion detector system with a protective cover; and
- periodically determining whether the chassis intrusion detector system has detected tampering and if so, erasing or deleting the at least one private key to thereby prevent authorized use of the card,
- the protective cover including a top cover on the first side of the substrate over a portion of the chassis intrusion detector system on the first side of the substrate, the top cover including a respective opening aligning with the at least one biometric data entry device, and a bottom cover on the second side of the substrate over a portion of the chassis intrusion detector system on the second side of the substrate such that the substrate and the chassis intrusion detector system are between the top and bottom covers.

17. The method of claim 16, wherein the step of enclosing the substrate with the chassis intrusion detector system comprises covering the first side of the substrate with the conductors but not in an area over the at least one biometric data entry device.

18. The method of claim 16, further comprising displaying information about a transaction about to be effected using the card or that has just been effected using the card on a display on the first side of the substrate, the step of enclosing the substrate with the chassis intrusion detector system comprises covering the first side of the substrate with the conductors but not in an area over the display.

19. The method of claim 16, wherein the step of initiating the process requiring use of the at least one private key for authorized use of the card comprises:
- transmitting an identification number of the card from the card to a terminal sought to be used by the card, the identification number being directed from the card to a server that retrieves a public key associated with the identification number and directs a transmission to the terminal encoded based on the public key to be directed from the terminal to the card; and
- decoding the transmission, using a processor at the card and the at least one private key and directing the decoded transmission to the server, whereby receipt of the correctly decoded transmission by the server allows for use of the card.

20. The method of claim 19, wherein after receipt of the decoded transmission at the server, an additional transmission is directed from the server to the terminal encoded based on the public key to be directed from the terminal to the card, the method further comprising:
- decoding the additional transmission, using the processor at the card and the at least one private key, and associating the decoded transmission with an approval key; and
- requiring action by the authorized user via an input device on the card to cause transmission of the decoded transmission to the server, whereby receipt of the decoded transmission by the server indicates allowability of the transaction.

* * * * *